United States Patent [19]
Terai et al.

[11] 4,321,453
[45] Mar. 23, 1982

[54] ELECTRON-BEAM WELDING

[75] Inventors: Kiyohide Terai, Arlington; George Mackertich, Plymouth, both of Mass.

[73] Assignee: International Vacuum, Inc., Pembroke, Mass.

[21] Appl. No.: 146,205

[22] Filed: May 5, 1980

[51] Int. Cl.³ .......................................... B23K 15/00
[52] U.S. Cl. ...................... 219/121 ED; 219/121 EM
[58] Field of Search ................. 219/121 EC, 121 ED, 219/121 EB, 121 EM, 121 EF, 121 EG, 121 PJ, 121 PK, 121 LC, 121 LD

[56] References Cited
FOREIGN PATENT DOCUMENTS

| | | | |
|---|---|---|---|
| 52-26331 | 2/1977 | Japan ............................ | 219/121 EC |
| 54-37090 | 11/1979 | Japan ............................ | 219/121 ED |

Primary Examiner—C. L. Albritton
Attorney, Agent, or Firm—Wolf, Greenfield & Sacks

[57] ABSTRACT

An electron-beam welding system for use in welding large masses of magnetic metals such as steel. Abutting segments of metal masses such as adjacent plates are welded by electron-beam welding. Two electron-beam welding units are used. One unit is used from one side of the plates to preheat the joint to a temperature to the transformation melting temperature. This preheating eliminates the magnetic field in the heating area. Subsequent electron-beam welding from the other side of the plates, while still hot, creates a welded joint in which the electron-beams are unaffected by magnetic fields within the plates.

5 Claims, 5 Drawing Figures

ELECTRON-BEAM WELDING

SUBJECT MATTER OF THE INVENTION

The present invention relates to electron-beam welding and, more particularly, to a means and method of electron-beam welding of large masses of metal having inherent magnetic fields.

BACKGROUND OF THE INVENTION

Conventional TIG or MIG welding techniques have long been used for welding large masses of metal. These techniques have inherent limitations. Specifically, such techniques require the use of large amounts of heat and frequently result in significant power waste. Further, such techniques frequently result in weak weld because of metal crystalization. These techniques are also highly labor inefficient.

More recently electron-beam welding has been used in place of such earlier technology. In electron-beam welding a collated stream of electrons is directed to the butting portions of the metal masses to be welded. This technique is highly satisfactory in welding comparatively thin pieces of metal together or in welding thicker and heavy masses of metal that have no inherent magnetic field. However, electron-beam welding has inherent limitations in welding heavy pieces of metal that have magnetic fields. In such heavy metal pieces there is a tendency of the electron-beam to skew from the intended path after the beam has passed partially through the metal. This skewing results from the influence of the magnetic field and in turn causes poor and defective welds. This difficulty is particularly acute in welding plates, tubes or other heavy metal pieces in a wide range of industrial uses including, for example, in coal liquification equipment and the like.

SUMMARY OF THE INVENTION

The limitations existent in presently available in electron-beam welding techniques are overcome in the present invention. In the present invention massive or thick plates of metal having inherent magnetic fields may be welded by first butting the pieces together to define the interface which is to welded. The plates are then heated from one side at the interface by an electron-beam welding unit to a temperature of up to and preferably at the metal transformation point. As is known in the art, heating metal to this point eliminates the magnetic field. While the metal is still heated to the transformation point in the area of the interface on one side of the plates, the interface is then welded from the other side by conventional electron-beam welding. The electrons passing through the butting metal plates at the interface heat the interface beyond the transformation point thereby effecting a weld. The electrons are not deflected by any magnetic field as they pass through and thus remain in their predetermined course which, presumably, is coincident with the interface. The electron-beams remain in their predetermined force because electrons are not normally deflected in an unheated metal until the beam has penetrated the metal a significant distance. At this point the electrons reach the heated portion where no magnetic field exists and therefore are not influenced to skew from the originally directed path.

The foregoing system provides an improved means and method for joining extremely thick plates of various steels or other metals with the welding more efficient and stronger than heretofore possible. The present invention is particularly adapted for use in welding special alloy materials now used more frequently in the manufacture or pressure vessels. Such special alloy materials frequently have residual magnetic fields that are stronger than the magnetic fields normally encountered in steel or conventional alloy elements.

The present invention is further designed to provide a more efficient system of welding in which the interface of the metals may be rapidly heated to a depth sufficient to increase the efficiency of welding. A further advantage and object of the present invention is to provide an improved preheating system for localized heating of the interface of butting large masses of metal under circumstances in which the subsequent cooling rate of the metal after welding is optimized with the solidification occuring without the likelihood of cold shuts at the root of full penetration of nugget areas.

A further object and advantage of the present invention is to provide a method for welding in which the occasional formation of gas pockets in thick joints is minimized or eliminated. A further object of the present invention is to provide a system in which electron-beam welding may be effected in part from the heated side in which the electron beam primarily used to preheat the interface is also used to partially weld prior to the complete welding by an electron-beam gun from the other side.

A further object of the present invention is to provide an improved system for welding in which the requirements of energy for welding large masses of metal is significantly reduced and in which preheating by induction or resistance means is eliminated.

BRIEF DESCRIPTION OF DRAWINGS

The foregoing objects and advantages of the present invention will be more clearly understood when considered in connection with the accompanying drawings in which.

DETAILED DESCRIPTION OF DRAWINGS

The present invention contemplates welding having metal plates which may have inherent magnetic fields using a plurality of electron beam generating guns of conventional design. In joining plates that are thicker than 6 inches, and having inherent magnetic field characteristics, problems have developed in using conventional electron beam welding technology because the inherent magnetic fields deflect or skew the electrons from the abutting interface of the plates being joined in a random fashion after the electrons have passed partially through the plates. While it is known that magnetic fields in plates of this type can be reduced by heating the steel to the metal transformation point of 768° C., no satisfactory method of means has been developed heretofore which permit heating of massive metal plates in an effective manner to this temperature.

Specifically the masses involved in plates conventionally used for large steel installations require such prodigious amounts of heat if conventionally applied that heating to eliminate the magnetic field becomes impractical. Among other things, such procedures are too slow and consume too much energy.

Figure 2:
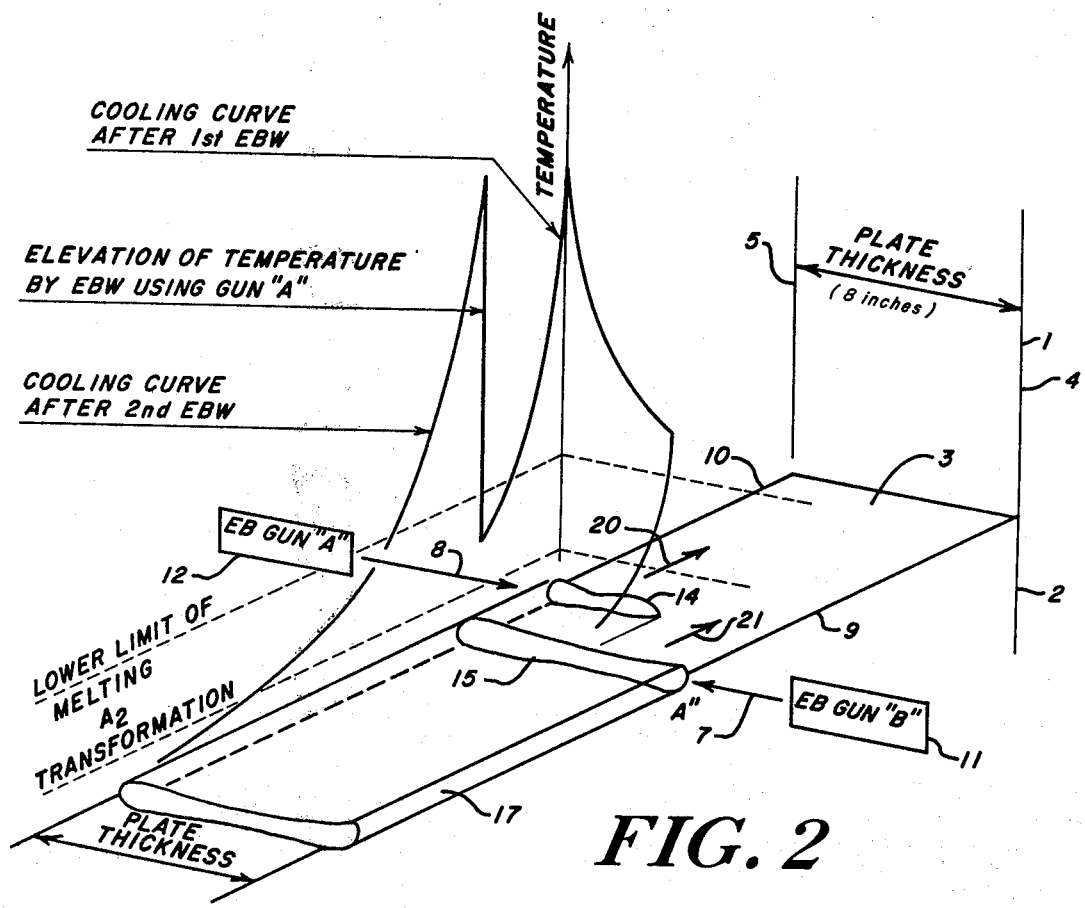
FIG. 2 is a perspective schematic illustration of a method of electron beam welding embodying a preferred form of the present invention.

In the present invention, and the preferred embodiment illustrated in FIG. 2, there is illustrated a method of welding two plates schematically illustrated at 1 and 2. These plates have facing surfaces along abutting edges which form an interface 3 which may be of indeterminate length and in the specific example illustrated, has a thickness of 8 inches from side 4 to side 5. Although these plates are illustrated as flat slab-like plates of uniform thickness of 8 inches, other shapes and sizes are also contemplated. For example, tubular steel pieces used in tanks or pressure vessels as well as structural steel girders and supports may be welded using this technology. The steel or metal used may vary, depending upon the particular application, but the present invention is particularly designed for use with steel having residual magnetic fields in the order of greater than one or two gauss. Electron beam welding of such metal presents a problem because the inherent magnetic field tends to disturb the desired direction of the electrons after the electrons have passed partially through the metal. Unfortunately, the inherent magnetic fields are not uniform in their deflection, thereby causing random deflections of the electrons after they have passed partially through the abutting portions of the metal plates.

In the process contemplated by the present invention, a pair of electron beam guns are oriented on opposite sides of the plates 1 and 2 and are aligned so that a stream of electrons may be emitted from each respectively in the direction of arrows 7 and 8. The gun which directs the steam of electrons 7 may therefore be arrayed to direct beams of electrons into the interface 3 from the longitudinal edge 9 while the gun used to direct stream of electrons 8 is aligned to pass these electrons from edge 10 of the interface.

In the preferred embodiments, the guns represented respectively by block 11 for stream 7 and block 12 for stream 8 are preferably suitably supported on a common support and are arrayed in such a fashion that these guns may be moved relative to the interface 3 in a direction parallel to and aligned with the plane of the interface 3. This may be achieved by providing suitable supports whereby either the guns are moved in synchronism relative to the metal plates or alternately the metal plates are moved between two guns which are fixed relative to one another.

In the preferred embodiment, gun 8 is aligned so that it directs a stream of electrons into the interface along a line approximately ½ inch ahead of the stream of electrons 7 directed by gun 11. The distance between the paths of the two streams 7 and 8 should be such that the metal will remain substantially at the desired metal transformation point to which it is heated by electrons 8 until after the metal at that temperature has been subject to stream of electrons 7.

Sufficient energy is provided to inject the electrons in stream 8 into the interface 3 at least a third and preferably one-half of the thickness of the metal. In the preferred embodiment, the nugget 14 defining the heated area should penetrate a thickness of the plates 1 and 2 at the interface 3 from edge 10 towards edge 9 a sufficient distance so that electrons subsequently introduced in stream 7 are not deflected by the inherent magnetic field of the metal.

Downstream of the gun 12 is, a noted earlier, gun 7. This gun, operating at a higher energy level, directs a stream of electrons from edge 9 into the interface 3 with sufficient energy to raise the temperature in the nugget 15 above the $A_2$ transformation point (768° C.). This stream of electrons 7 melts the metal along the nugget 15 thereby welding the two plates 1 and 2 together to form a weld 17. The stream of electrons 7 are not skewed or deflected as they pass from edge 9 of the interface towards edge 10 because the heated zone formed by stream of electrons 8 has eliminated or substantially minimized the magnetic field in the area through which the electron beam 7 passes in the area adjacent edge 10.

A suitable system may be arranged for synchonized movement of guns 11 and 12 from one end of the plates 1 and 2 towards the other. Thus, the guns 11 and 12 may be commonly supported for movement along opposite edges 9 and 10 of the interface 3 at a controlled rate of speed in the direction of arrows 20 and 21, with arrow 20 indicating the path of the zone heated to a temperature up to the $A_2$ transformation point (768° C.). The arrow 21 illustrates the path of the nugget 15 defining the weld.

In FIG. 2, there is also shown a temperature curve appropriately labeled in relation to the path or direction of heating and welding.

Figure 3:
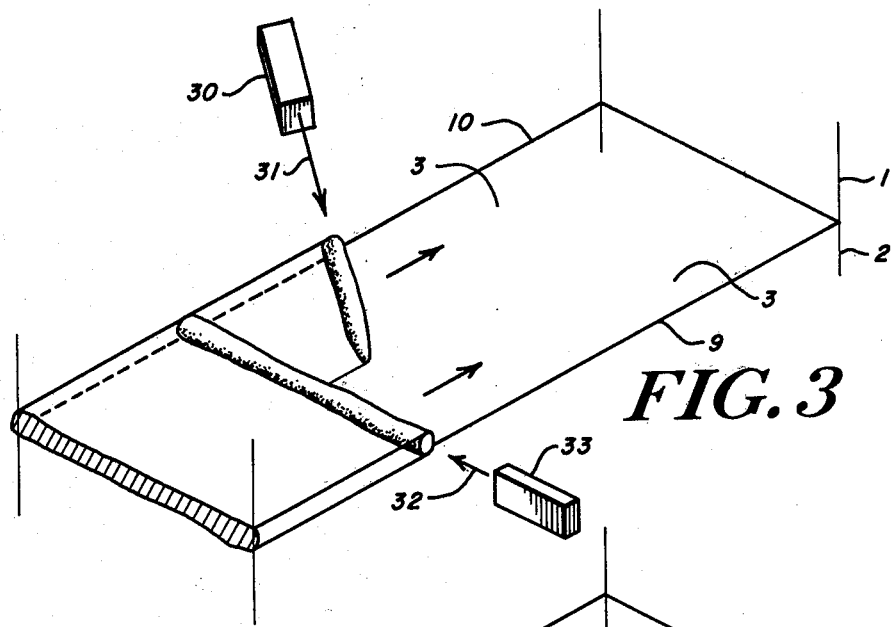
FIGS. 3 to 5, inclusive, are perspective schematic views of electron beam welding methods embodying modifications of the present invention.

FIG. 3 illustrates a modification of the present invention. In this embodiment, the source of electrons 30 used to direct a beam 31 for purposes of heating the metal along the interface 3 up to the $A_2$ transformation point (768° C.) is arranged at an angle as illustrated rather than parallel to the direction of the electrons 32 from the electron-welding gun 33 which is used to weld the two plates together.

The angular relationship of beam 31 to beam 32 minimizes the deterioration of gun 33. It also minimizes the likelihood of pits or gas pockets occuring when the weld is effected by the electron stream 32. This angular relationship appears not only to preheat but degases the metal. This, in turn, will result in a superior weld and will further reduce the beam pressure of beams from gun 30.

Controlling the angle of the beams 31 so that they are not parallel to the beams 32 also enhances the elimination of gas from edge 10 of the interface 3.

Figure 4:
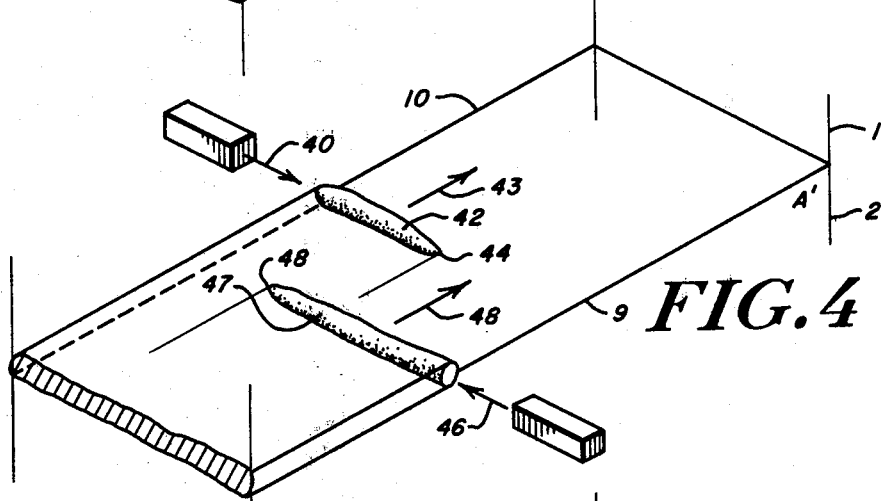

In FIG. 4, there is illustrated a further modification of the invention in which the electron beam 40 from edge 10 is used to preheat the nugget 42 moving in a direction of arrow 43 to a temperature in excess of the $A_2$ transformation (768° C.). At this temperature, the nugget 42 melts and defines a weld zone which penetrates the length of the nugget to a depth of preferably to more than half the thickness of the plates 1 and 2. The innermost point of weld 44 is selected such that an electron beam 40 has not deviated from its prescribed path. A second electron beam 46 from an electron source on the other side of the plates is focused into the interface with sufficient energy to form a weld. The depth of the nugget 47 formed by this electron beam 46 is sufficient to overlap a weld formed by beam 40 with the nugget terminating at point 48. This beam 46 moves parallel to beam 40 in the direction of arrow 48.

The common fusing zone comprising the space between points 44 and 48 may be effected by a single path from each side of the joint.

Figure 1:
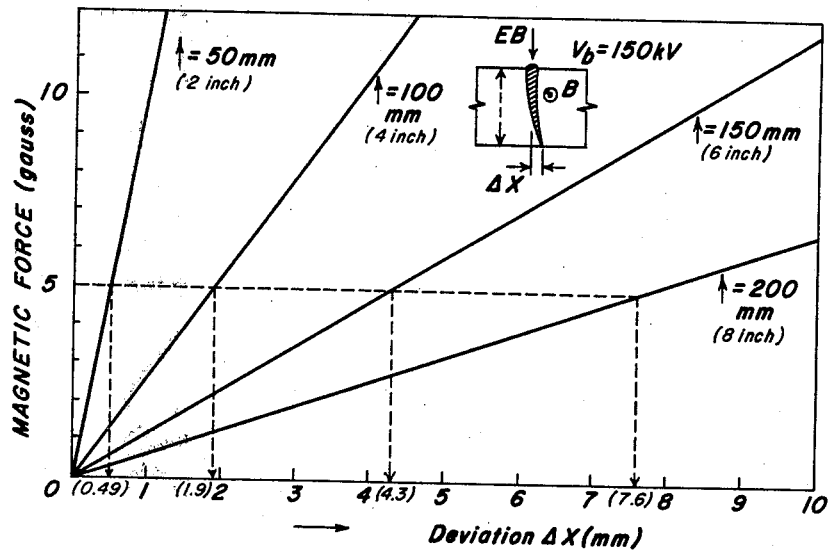
FIG. 1 is a graph illustrating the relationship between the magnitude of residual magnetic fields and the deviation of the nugget in welding steel plates using electron beam welding techniques of the present invention.

Several passes may be made from each side of the joint in the preferred embodiment described in FIG. 1. It has been found, however, that if the temperature of the steel is preheated to 100° C., the depth of penetration of the electron beam welding can be increased by about 7%.

Figure 5:
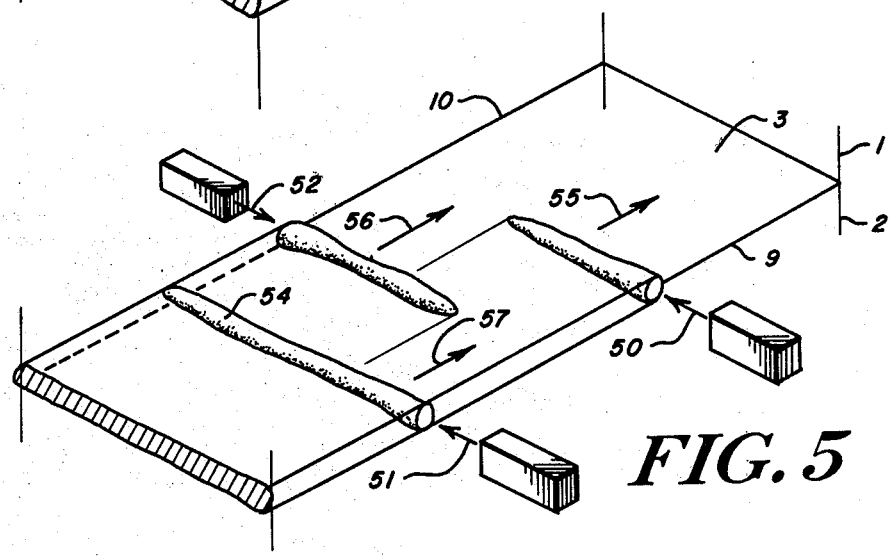

FIG. 5 illustrates the use of a plurality of electron guns to focus beams 50 and 51 from one side of 52 to the other side.

The beams 50 and 52 are directed inwardly from opposite edges 9 and 10 respectively of the interface 3 at an energy level sufficient to heat the interface 2, but not over the $A_2$ transformation point (768° C.). This heated zone precedes a beam 51 of higher energy content sufficient to pass entirely through the heated interface to form a nugget 54 without skewing or deviation of the beam since this beam 51 is passing through a preheated interface section. Movement of the beams relative to the metal plates is illustrated in FIG. 5 by the arrows 55, 56, and 57.

FIG. 1 illustrates deviation in millimeters of a nugget in relation to the magnitude of the residual magnetic field as measured in gauss in the case of a pair of steel plates joined using an electron beam welding technique. In this graph, the thicknesses of the plates are assumed to be 2, 4, 6, and 8 inches, respectively. It is apparent from this Figure that 5 gauss of residual fields may still cause lack of penetration at the reverse side of the joint when the plate thickness exceeds 4 to 6 inches. It is for this reason that the present invention provides an improved method of forming welds of comparatively thick steel plates having residual magnetic fields in excess of 5 gauss.

Having now described our invention, we claim:

1. A method of electron beam welding two metal plates of which at least one is formed of a magnetic material along abutting edges forming an interface between said plates comprising directing an electron beam from one edge of said interface inwardly thereof until the temperature of the metal at the interface adjacent said one edge is close to the metal transformation point whereby any magnetic field inherent in said metal plate is eliminated, and thereafter while said metal remains substantially at said temperature, directing an electron beam from the other edge of said interface until the temperature is raised above the metal transformation point between said edges thereby welding said plates together along said interface.

2. A method of electron beam welding two metal plates of which at least one is formed of a magnetic material, along abutting edges forming an interface between said plates comprising defining a path devoid of magnetic field at least partially along said interface from one edge thereof by heating said path to a temperature sufficient to reduce any inherent magnetic field in said path, and while maintaining said temperature passing a stream of electrons through said interface from an edge remote from said one edge to and through said path whereby the metal at said interface is raised to a welding temperature and said plates are welded together.

3. A method as set forth in claim 2 wherein the temperature in said path is heated by passing a stream of electrons into said interface from said one edge.

4. A method as set forth in claim 3 wherein said streams of electrons are moved simultaneously along said interface.

5. A method as set forth in claim 3 wherein said path is angular to said stream of electrons from said remote edge.

* * * * *